US012259931B2

(12) United States Patent
Staszak et al.

(10) Patent No.: US 12,259,931 B2
(45) Date of Patent: Mar. 25, 2025

(54) INTERACTIVE WEBSITE AUTOMATION FOR HEALTH CARE WEB PORTALS WITH RANDOM CONTENT

(71) Applicant: VOLUWARE, INC., Huntington Beach, CA (US)

(72) Inventors: Martin Staszak, Huntington Beach, CA (US); Yisi Chen, Fountain Valley, CA (US)

(73) Assignee: Voluware, Inc., Huntington Beach, CA (US)

( * ) Notice: Subject to any disclaimer, the term of this patent is extended or adjusted under 35 U.S.C. 154(b) by 610 days.

(21) Appl. No.: 16/597,015

(22) Filed: Oct. 9, 2019

(65) Prior Publication Data

US 2020/0110781 A1  Apr. 9, 2020

Related U.S. Application Data

(60) Provisional application No. 62/875,317, filed on Jul. 17, 2019, provisional application No. 62/743,502, filed on Oct. 9, 2018.

(51) Int. Cl.
*G06F 16/951* (2019.01)
*G06F 9/54* (2006.01)
*G06F 16/9538* (2019.01)
*G06F 21/31* (2013.01)

(52) U.S. Cl.
CPC .............. *G06F 16/951* (2019.01); *G06F 9/54* (2013.01); *G06F 16/9538* (2019.01); *G06F 21/31* (2013.01)

(58) Field of Classification Search
CPC ...... G06F 16/951; G06F 16/9538; G06F 9/54; G06F 21/31
See application file for complete search history.

(56) References Cited

U.S. PATENT DOCUMENTS

| 8,954,416 B2* | 2/2015 | Tuttle | G06F 16/951 |
| | | | 707/711 |
| 9,436,763 B1* | 9/2016 | Gianos | G06F 16/958 |
| 2006/0282494 A1* | 12/2006 | Sima | H04L 63/12 |
| | | | 709/200 |

(Continued)

OTHER PUBLICATIONS

"WebDriver" retrieved from https://w3c.github.io/webdriver/ on Sep. 1, 2021, pp. 1-186.

*Primary Examiner* — Sherrod L Keaton
(74) *Attorney, Agent, or Firm* — One LLP

(57) ABSTRACT

A system and method for controlling a headless browser automation (an automation that does not render web pages or involve direct user input), where the web portals accessed by the browser automation employ a rule system for generating web content and the rules can result in the dynamic presentation of new response elements that could not be a priori determined from existing content already encountered, or the history of interaction with the web portal. The control system has the capability to pause the headless browser automation in place, collect the new information being requested by the web portal, present the requested new information to a remote user, capture the information from the remote user, feed the information collected to the portal automation, and restart the automation from the point that it left off.

24 Claims, 10 Drawing Sheets

(56) References Cited

U.S. PATENT DOCUMENTS

| 2014/0046678 | A1* | 2/2014 | Lacy | G06Q 40/08 |
| | | | | 705/2 |
| 2014/0249857 | A1* | 9/2014 | Moore | G16Z 99/00 |
| | | | | 705/3 |
| 2017/0301026 | A1* | 10/2017 | Bensemana | G06V 30/40 |

* cited by examiner

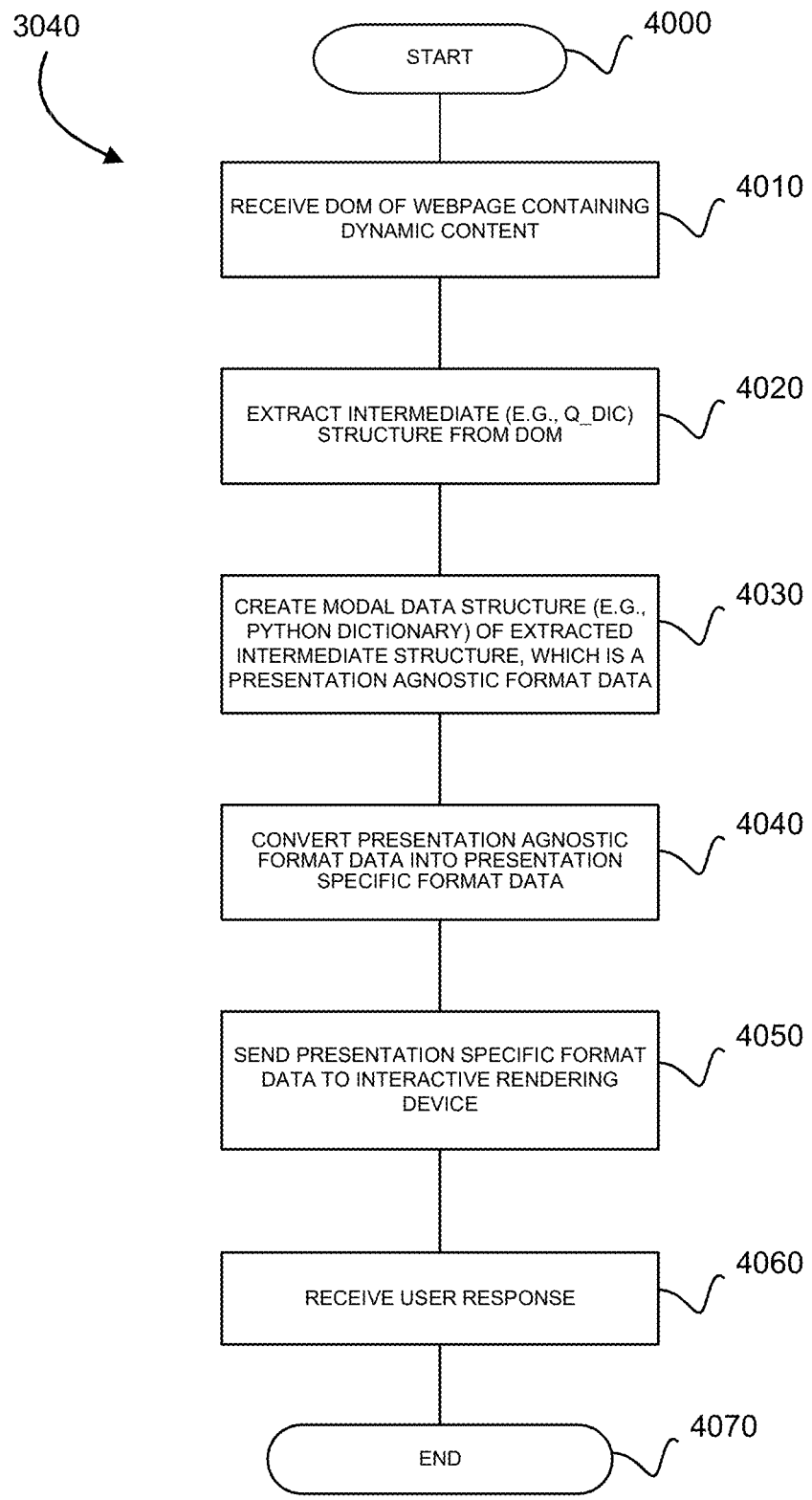

FIG. 5

```
<div id="AuthRequestClinicalQuestions">
<from id="form1">
    <div class="ClinicalQuestions">
        <div class="AuthClinicalQuestions">
            <span>Clinical Questions</span>
            <div>
                <div id="QuestionP">
                    <span id="Question">Which of the following is the primary reason
for the study?</span>
                    <span id="Answers" answer_type="radio">
                        <input type="radio" id ="1">
                        <label>Aneurysm</label>
                        <input type="radio" id ="2">
                        <label>Aortic dissection</label>
                        <input type="radio" id ="3">
                        <label>Thrombosis in the systemic and portal venous
circulations</label>
                        <input type="radio" id ="4">
                        <label>Henoch-Schonleion purpura (HSP)</label>
                        <input type="radio" id ="5">
                        <label>None of these apply</label>
                        <input type="radio" id ="6">
                        <label>Unknown</label>
                    </span>
                </div>
            </div>
        <div class="buttons">
            <input type="submit" id="Back">
            <input type="submit" id="Next">
        </div>
    </div>
</from>
</div>
```

DOM of Sample Dynamic Content 101

FIG. 6

Dynamic Content in the form of a question needing a free-text response

```
<div name="ClinicalQuestions">
    <div>
        <span>Clinical Details</span>
        <div>
            <span id="ClinicalQueston">
                <div name="QuestionPart">Please describe the reason for this request</div>
                <div name="AnswersPart" answer_type="textarea">
                    <textarea></textarea>
                </div>
            </span>
        </div>
        <div>
            <button type="submit" id="Next"></button>
        </div>
    </div>
</div>
```

FIG. 7

```
question_dict = {
    "question"     : "Which of the following is the
primary reason for thE study?",
    "question_type": "radio-button",
    "opt_list"     : ['Aneurysm','Aortic
dissection','Thrombosis in the systemic and portal
venous circulations','Henoch-Schonleion purpura
(HSP)','None of these apply','Unknown'],
    "site"         : "Provider site 1"
}
```

FIG. 8

```
question_dic = {
    "question"     : "Please describe the reason for
this request",
    "question_type": "textarea",
    "opt_list"     : ['Please type Below'],
    "site"         : " Provider site 2"
}
```

FIG. 9

```
{
    "class": "Modal",                                           Context 910
    "type": "radio",
    "header": {
        "class": "ModalHeaderElement",
        "title": " Provider site 1",
        "subtitle": " Which of the following is the primary reason for
        the study?"
    },
    "body": [
        {
            "class": "ModalBodyElement",                Response
            "type": "radio-button",                     Required
            "title": "Aneurysm"                         930
        },
        {
            "class": "ModalBodyElement",
            "type": "radio-button",
            "title": "Aortic dissection"
        },
        {
            "class": "ModalBodyElement",
            "type": "radio-button",
            "title": "Thrombosis in the systemic and portal venous
            circulations"
        },
        {
            "class": "ModalBodyElement",
            "type": "radio-button",
            "title": "Henoch-Schonleion purpura (HSP)"
        },
        {
            "class": "ModalBodyElement",
            "type": "radio-button",
            "title": "None of these apply"
        },
        {
            "class": "ModalBodyElement",
            "type": "radio-button",
            "title": "Unknown"
        }
    ],
    "OK_label": "OK",
    "Cancel_label": "Cancel"
}
```

Data 920

Sample JSON: Multiple Choice Question

FIG. 10

Sample JSON: Free-Text Response

```
{
    "class": "Modal",
    "type": " textarea ",
    "header": {
        "class": "ModalHeaderElement",
        "title": " Provider site 2",
        "subtitle": "Please describe the reason for this request"
    },
    "body": [
        {
            "class": "ModalBodyElement",
            "type": "textarea",
            "title": "Please type blow"
        }
    ],
    "OK_label": "OK",
    "Cancel_label": "Cancel"
}
```

INTERACTIVE WEBSITE AUTOMATION FOR HEALTH CARE WEB PORTALS WITH RANDOM CONTENT

CROSS-REFERENCE TO RELATED APPLICATION

This application claims priority pursuant to 35 U.S.C. § 119(e) to U.S. Provisional Application No. 62/743,502 filed Oct. 9, 2018, and U.S. Provisional Application No. 62/875,317 filed Jul. 17, 2019, the disclosures of each of which are hereby incorporated by reference in their entireties.

FIELD

The present disclosure relates to methods and apparatus for website interactions, and more specifically to automation of interactions with web portals that present dynamic content.

BACKGROUND

Web portals, or web sites as they are commonly known, provide a means for human users to access information over the Internet. The process of presenting the information to the human user is commonly called rendering, and web sites make use of different types of controls that make human interpretation of the information more meaningful. Familiar controls are drop down lists where data can be selected, or calendar controls where dates can be visualized. Web site controls, and for that matter, web sites themselves, are under continuous development and improvement as speed of access and ease of use are absolutely essential for human acceptance; otherwise, humans won't use the web site.

Web sites are often used to collect data from a user in order to provide a service. Any web page that supports a search capability has a control for the user to enter a search criteria, and the web site will display information related to the search data entered. Some web sites provide very rich services. For example, a site like Travelocity will allow a user to enter in data for dates and destinations, and then it will respond with flight options matching that criteria entered by a user. Many web sites collect credit card information in order to provide a billing service.

A "headless browser" is a software program that can be controlled with configuration and additional programmatic instructions to interact with a website without any human user involved. Those skilled in the art are familiar with PhantomJS, as one example, which is an implementation of a headless browser, though there are others. A browser is referred to as "headless" when it does not render any information to a human user and all of its interaction with a web portal is under software control. A headless browser can inspect HTML to identify controls to interact with, push data into controls, click buttons, and navigate around, again, even though no user is actually involved in the interaction.

The use of a headless browser to automate web portal interaction is sometimes referred to as "web scraping" or "scraping." For example, headless browsers are commonly used in testing web portals so that a service provider can ensure that a web site under development is responding to user inputs with meaningful responses for both valid and invalid data inputs. A headless browser typically interacts with a single website, and can typically mimic any user interaction.

An "Internet bot," or "bot," is an application used to interact autonomously with web portals and it may or may not make use of a headless browser. Many web site developers, for reasons including web site performance or web site data privacy, may include features designed to discourage the effectiveness of a bot at being able to gather information from a website. These features, such as Captcha, and the use of two factor authentication, are designed to ensure that a real human user is driving the interaction with a web site.

For the purposes of this disclosure, "website automation," "web portal automation," "portal automation," "web site interaction automation," or "portal interaction automation" refers to a process of using a headless browser to script the interaction of a human user on a website where:

1. a human user's credentials are used to access the site, and
2. the human user has a legitimate account and legitimate business purpose to access the site.

Under this definition, the series of interactions with the portal taken by the automation are not distinguishable from the common actions and permitted use of the human user on the site. Further, the data inputs reflect the intent of the human user, and the data collected is for the sole usage of the human user. In this way, the portal automation is a time-saving and labor saving device for the human user.

Many web site developers have competing requirements. Ease of use requirements that drive making site usage as fast and easy as possible are in conflict with data privacy requirements that motivate the inclusion of forced human interaction features that inevitably make a web site more time-consuming to use.

Two factor authentication and Captcha represent two well-known examples of forced human interaction requirements that create problems for portal automations, but they are not the only ones. Many service providers have complex data sets and data access rules that can change at any time. Some service providers will present questionnaires where the set of questions and the format of responses cannot be known in advance by a portal automation designer.

It would be desirable, therefore, to develop new methods and other new technologies for interactive website automation, which provide a method and system to: start and stop (pause) a headless browser automation process; for a paused automation process to define a presentation-agnostic query set and allow a human user to specify information to enable the automation process to continue; present the presentation-agnostic query set to a remote user with a man-machine interface, using, among other techniques, dynamically generated web controls; deliver inputs gathered from the remote user to the automation process, or a combination of any of the foregoing. Moreover, the method and system should not be restricted to pre-determined stopping points and may be stopped and restarted numerous times, allowing for a series of iterations to be performed to reach a successful endpoint. Still further, the method and system should not be restricted to any specific data formats, and it is desirable for them to work with any service interface that supports a request/response transaction semantic.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of some embodiments, a computer-implemented method or apparatus for controlling a headless browser automation includes performing one or more of the following steps: scraping a plurality of web portals; receiving a dynamic content containing data in a presentation specific form from one or more of the plurality of web portals; pausing scraping of the plurality of web portals; extracting context information and a desired response from the dynamic content, the extracted context information including data set for utilization management necessary for continuing scraping of the plurality of web portals; converting the received data into a presentation agnostic form; presenting the converted data to a user via a human user rendering and response collection system; receiving the desired response from the user; and resuming scraping of the plurality of web portals using the received desired response.

In an aspect, the human user rendering and response collection system includes a man-machine interface selected from a group consisting of a touchscreen, a voice response system, a user interface designed for use by a human with disabilities, a brain-computer interface, or a combination thereof.

In an aspect, the converted data is presented to the user using a representational state transfer (REST) application programming interface (API), wherein the desired response is received from the user using the REST API, or both.

In an aspect, the data in the received dynamic content s converted into the presentation agnostic form by a sub function configured to support a plurality of dynamic content response use cases.

In an aspect, the plurality of dynamic content response use cases include a request to submit free text response, a request to enter multi-factor authentication code, and a request to answer multiple choice question.

In an aspect, the sub function produces a modal from a question dictionary.

In an aspect, the modal of the question dictionary is specific to each of the plurality of dynamic content response use cases.

In an aspect, the modal is convertible into a language-independent data format.

In an aspect, the modal is in a Python dictionary format

In an aspect, the language-independent data format is JavaScript Object Notation.

In an aspect, the presentation specific form is specific to each of the plurality of web portals.

In an aspect, the data set for utilization management includes one or more prior authorization requests.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4 is a flow chart illustrating aspects of the dynamic human engagement process according to an embodiment of the present disclosure.

FIGS. 5-6 illustrate examples of dynamic content DOMs which may be used in accordance with some aspects of the present disclosure.

FIG. 7-8 are a sample Q_DIC modal codes that may be extracted from the DOMs in accordance with some embodiments of the present disclosure.

FIG. 9-10 are sample JSON files that may be generated in accordance with some embodiments of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
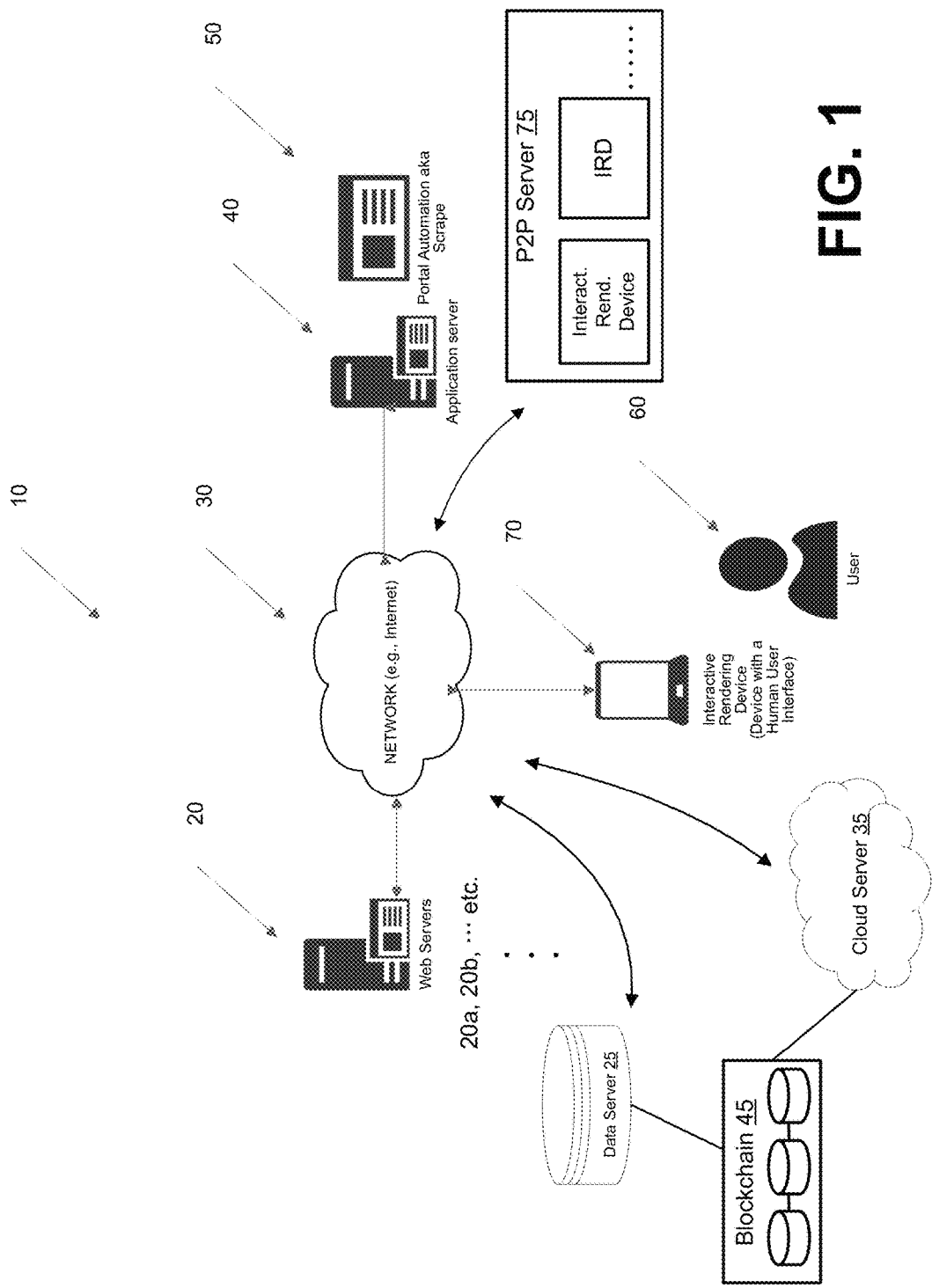
FIG. 1 is a schematic block diagram illustrating aspects of a system and apparatus for automation of interactions with web portals with dynamic contents in accordance with an embodiment of the present disclosure.

FIG. 1 illustrates aspects of a computer-based system for headless browser automation 10 according to an embodiment of the present disclosure. In an aspect, the system 10 for interactive website automation with dynamic contents includes computer servers such as a number of web servers 20 communicably coupled to (hereinafter "coupled to," which includes both direct and indirect, and physical and logical, connections between two or more referenced entities) a network 30 such as the Internet, and serving web pages on the network 30. The web servers may also be referred to as web portals. The system 10 also includes one or more application servers 40 coupled to the network 30 and interacting programmatically with web servers 20 using one or more portal automations 50 running on and/or accessible by the application servers 40, and one or more interactive rendering devices 70 coupled to the network 30 and accessible by one or more human users 60 for interacting with the portal automation 50 or web servers 20 when needed. The system 10 may also include a data server 25, a cloud server 35, and/or a peer-to-peer (P2P) server 75 coupled to the network 30. P2P server may include an interactive rendering device 71, an interactive rendering device 72, and so on. The data sever 25 and the cloud server 35 may be coupled by a blockchain 45. Other architectures may also be suitable.

In an aspect, the network 30 includes one or more networks, for example a Wide Area Network (WAN) 30 (e.g., the Internet) and/or a wireless communication network (WCN), for example a cellular telephone network, using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof.

In some instances, the servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers.

In an aspect of the present disclosure, each of the one or more web servers 20 may be a device having one or more processors, memory, an operating system, input/output interfaces, and a network interface, and running a program (e.g., Apache Tomcat, NGINX, Windows IIS, and so forth) that supports communication using the HTTP protocol including any of its current and future variants (e.g., HTTP 1.0, HTTP 1.1, and HTTPS). While a web server 20 commonly responds to requests on ports 80 or 443, in some instances, the web server 20 may be configured to run on any port on a computing device. In an aspect, the portal automation 50 interacts with the web service 20 using the HTTP protocol, and the interaction may be carried out, for example, by the portal automation 50 sending HTTP request messages to the web server 20, and by the web server 20 communicating back to the portal automation 50 using HTTP response messages.

In an aspect, the interactive rendering device 70 is a device running a computer program that is capable of interacting with a human user 60, where interaction consists of the rendering device 70 communicating information to the human user 60 and collecting responses from the human user 60. System 10 of an embodiment of the present disclosure includes one or more output devices, e.g., a visual display and/or speaker for rendering information visually or audibly or both, and one or more input devices, such as a trackpad, a keyboard, a mouse, a microphone, a touchscreen, etc. In an aspect, the interactive device 70 encompasses any device with a man machine interface.

For example, interactive rendering devices 70 (client devices) may include smartphones, smartwatches, voice response systems (incl. smart speakers), computers designed for use by humans with disabilities, brain-computer interfaces (BCIs), portable electronic devices (incl. wearable devices), notepad computers, tablets, laptop computers, personal computers, and special-purpose human interface devices such as vehicle media control units with or without touch screens or voice recognition systems installed as part of vehicular electronic systems, etc.

Computer servers including web servers 20 and/or application servers 40 may be implemented in various architectures. For example, the environment 10 may include one or more application servers 40 containing documents and application code compatible with World Wide Web protocols, including but not limited to HTML, XML, PHP (PHPDoc) and JavaScript documents or executable scripts, for example. The environment 10 may include one or more data servers 25 and/or cloud server 35 for holding data such as personal data including patient data, medical data, insurance plan benefits data, etc., including text, video, audio-video, audio, graphical content components, medical charts or history, prior authorization requests, for consumption using a client device or for an essential data exchange between an web portal (e.g., insurance payor portal) and a service provider (e.g., a healthcare provider); for holding software for execution on or in conjunction with application server 40 or interactive rendering devices 70, for example human user rendering and response collection application (600; See, FIG. 2), and data collected from users 60 or interactive rendering devices 70. Data collected from interactive rendering devices 70 or users 60 may include, for example, user identity, user profile (user profile data), insurance benefits data, and application data. User identity, user profile, and insurance data may be collected by a background (not user-facing) application operating on the interactive rendering device 70, and transmitted to a data sink, for example, a cloud-based data server 35 or discrete data server 25. Application data means application state data, including but not limited to records of user interactions with an application on an application server 40 or web portals 20, or other inputs, outputs or internal states from interacting with the application server 40 or web portals 20. Applications may include software for interactive scraping and supporting functions. Applications and data may be served to one or more system nodes including interactive rendering device 70 or portal automation 50 from one or more of the foregoing servers (e.g., 20, 25, 35, 40) or other types of servers, for example, any server accessing a distributed blockchain data structure 45, or a peer-to-peer (P2P) server 75 including a peer-to-peer network such as a mesh network (including partial, full, and wireless mesh networks), such as may be provided by a set of interactive rendering devices 71, 72, etc., and the like, operating contemporaneously as micro-servers or clients.

In an aspect, information held by one or more of the data server 25, cloud-based server 35, distributed blockchain data structure 45, or P2P server 75 may include a data structure of user data, which may include, but not limited to, data components such as patient data, medical records, medical history, insurance benefits, primary insurance, secondary insurance, in-network benefits, out-of-network benefits, deductibles, out-of-pocket amounts, co-pays, prior authorization requests, clinical necessity, financial responsibility, clinical services, insurance claims, pre-existing conditions, family history, utilization management data, etc. The data structure may relate user-perceivable aspects of user data to identifiers of the user data. For example, in an aspect, the data structure do so by using profile values, and to one or more indicators of semantic meaning relevant to one or more data components, and other unique metadata sets characterizing each of the components.

The network environment 10 may include various devices (such as devices 70, 71, 72, . . . , etc., collectively referred to as interactive rendering devices 70), for example an autonomous or connected vehicle, digital signage, information/payment kiosk, automated teller machine, electronic ticket counter, etc., that may be connected to servers via the network 30, and the like. In general, device 70 may be, or may include or communicably connected to, computers used by users to access data content provided via a server or from local storage.

In an aspect, the system 10 according to an embodiment of the present disclosure includes a public Internet as part or all of the network 30, but the network may not be limited to the public network, or presence of a physical network. In an aspect, the portal automation 50 is able to interact with one or more web servers 20 using HTTP messages, and the portal automation 50 is able to interact with an interactive rendering device 70. Physical networks include telephone lines, coaxial wires, ethernet cables, optical cables and the electric field, and the network nodes may contain hardware to send and receive signals over one or more of these physical strata. Operating systems use a variety of techniques to simplify the use of physical hardware by other software programs, which includes providing services for other programs to use that logically represent physical networks. Software programs thus interact with the operating system for the purposes of sending and receiving messages. The operating system has the logic to determine if messages result in the exchange of data over a physical network interface, or if the messages are transferred between two software programs on the same node or device.

In an aspect, the web server 20, a portal automation 50, and a rendering program on a rendering device 70 are all software programs that may be executed by one or more processors of servers, nodes, and/or devices in the system 10 and not constrained to a specific hardware arrangement. In an aspect, the system 10 may not be limited to the presence of separate servers and nodes or devices interacting over the Internet 30. In an aspect, the system 10 includes web servers 20, portal automation 50, and interactive rendering devices 70 all running on the same device with no physical network. In another aspect, the nodes 20, 50 and 70 can be on separate devices or the same device in any combination, and in cases where there is a physical network for any of 20, 50 or 70 to interact with one another, the network 70 can be any network, including private networks, with the only requirement that a web server be present on the network that supports a HTTP protocol.

Figure 2:
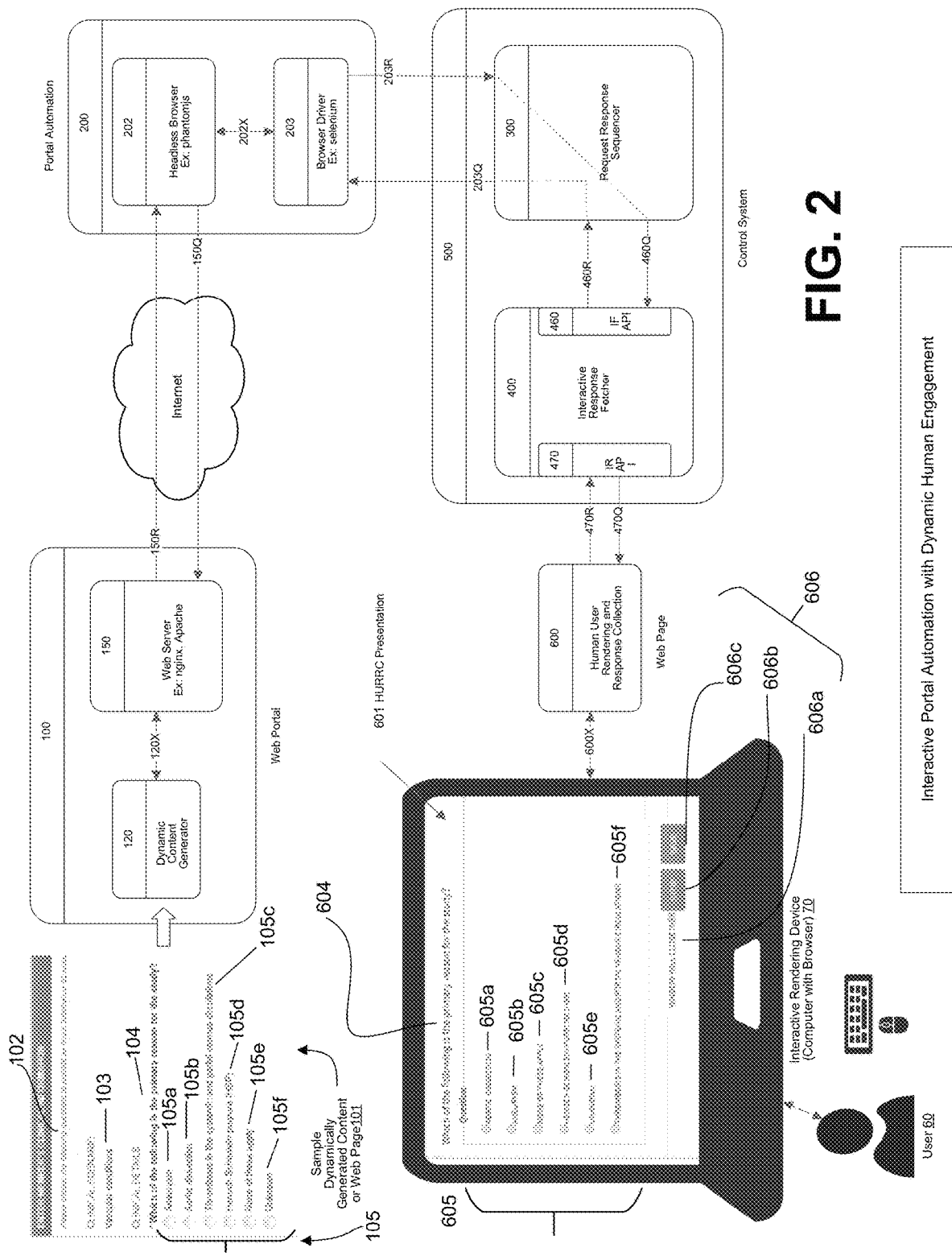
FIG. 2 is a schematic block diagram illustrating aspects of the system and apparatus for automation of interactions with web portals with dynamic contents in accordance with an embodiment of the present disclosure in more detail.

FIG. 2 illustrates an aspect of the system 10 according to an embodiment of the present disclosure in more detail. The web server(s) 20 of FIG. 1 (either singly or collectively) is now represented as a web portal 100, which includes the web server program 150 and a dynamic content generator 120. In an aspect, the interface 120X between the dynamic content generator 120 and the web server program 150 is logical only and intended to show that there is some facility for the web server 150 to provide one or more dynamic contents 101 in response to an HTTP message that it receives.

In an aspect, the dynamic content 101 is a dynamic web content such as a dynamically generated web content, including but not limited to, a questionnaire in the form of a web page. Dynamic content may be adaptive content, or personalized content, or both. As used herein, the term, "dynamic content" refers to any information contained in an HTTP response, of any content-type, for which a portal automation does not have logic or data to continue a predefined script of interaction without engaging another facility, such as a human user, to provide necessary and sufficient logic or data to continue.

In an aspect, the present disclosure includes a system for handling any type of dynamic content produced by a web portal 100. Those skilled in the art of web programming and portal automation understand that HTTP responses include a content-type that can be a wide range of data formats and data values. The art of portal automation involves the use of information in HTTP responses.

In an aspect, the system 10 uses what is known as the DOM (Document Object Model), to find controls on a web page which may or may not include a dynamic content, presented by a web portal 100 and manipulate them programmatically. The DOM is a document object model standard originally developed by W3C (World Wide Web Consortium) and later taken over by WHATWG (Web Hypertext Application Technology Working Group). DOM is an object oriented representation of a web document (HTML, XML. Etc.) that acts as an interface between a webpage scripting language (e.g., JavaScript) and the web document itself. DOM can define the properties, methods and events of an HTML element (node). In an aspect, DOM is a tree-like representation of the contents of a webpage, i.e., a tree of nodes (objects representing a part of the web document) with various relationships depending on their arrangements in the web document. The present disclosure, however, is not restricted to the use of DOM (W3C) for portal automation, and other variants, modifications, or related technologies for manipulating contents of a webpage may be used. Alternatively, web portals 100 may support interactivity and dynamic content using other content-types (e.g., JSON, XML, free text, etc). In an aspect, visual DOM (HTML) and/or other content-types may be used for the body of the requests and responses. In an aspect, the dynamic content generator 120 can produce other content-types, and the web server 150 can support other request bodies. For example, web portals 100 may support a program supported by a representational state transfer (REST) protocol, such as a REST API, and the process of submitting a prior authorization may involve a sequence of REST API calls without any visual DOM (HTML), but rather, such content-types can be considered as non-visual DOM. For example, instead of a visual DOM, JSON data may be used instead. Hereinafter, these technologies including visual and non-visual DOM are collectively referred to as "DOM."

Still referring to FIG. 2, the system 10 includes portal automation 50 of FIG. 1, now referred to as portal automation 200. In an aspect, the portal automation 200 includes a headless browser 202, examples of which include PhantomJS, Headless Chrome driver, among others, and a programmatic interface to the headless browser called a headless driver 203, such as Selenium, etc. In an aspect, the headless browser 202 manipulates the DOM by activating controls, entering data into elements that support input, and stimulating buttons that result in the execution of JavaScript programs embedded in the web page. In some instances, DOM manipulation results in HTTP requests being sent to the web portal 100, represented in FIG. 2 as the interface 150Q. The HTTP protocol is designed as a request/response arrangement, and the headless browser 202 processes HTTP responses represented as 150R from the web portal 100.

Headless browser technology provides one aspect of the functionality necessary to perform portal automation. In an aspect, a second technology component referred to as a headless driver 203 is also required, where Selenium is a known example. For example, headless driver 203 provides the programmatic interface to the headless browser 202 so other programs, such as the control system 500 shown in FIG. 2, can use function calls to access and inspect elements of the DOM, enter data into control elements that support inputs, and perform operations that a human user can or would typically perform using a keyboard and mouse (or other user interface) on a web page, to be performed by the headless browser 202.

In an aspect according to an embodiment of the present disclosure, interface 203Q represents a set of functions provided by the Python Selenium module available for control systems 500 to use. The interface 203R represents an output of the function calls for control systems 500 to process.

In an aspect, portal automation 200 is a series of function calls represented as interface 203Q being made to the headless driver 203, which results in the headless browser 202 performing DOM manipulation of a certain form, and returning the DOM manipulation results to the browser driver 203 over interface 202X which in turn are provided back to a control system 500 in the form of a function output represented as interface 203R.

In an aspect, the interface 202X between the headless browser 202 and the headless driver 203 is a Web Driver Interface in compliance with a W3C standard (https://w3c.github.io/webdriver/). In some aspects, while Selenium provides the headless driver 203 function in certain embodiments, a control system 500 may also choose to interact directly with a headless browser 202 over the interface 202X when the headless browser 202 conforms to the interface standard of the headless driver 203, such as the W3C standard or other suitable standards.

Still referring to FIG. 2, the system 10 of the present disclosure includes a control system 500, which embodies an interactivity aspect of the present disclosure. In an aspect, some or all aspects of the control system 500 may or may not reside, or instantiated, on the same application server 40 as some or all aspects of the portal automation 200. In an aspect, the control system 500 includes logical structures such as a request response sequencer 300 and an interactive response fetcher 400. The request response sequencer 300 initiates a connection and sends requests to a web portal 100 by using functions provided by the headless driver 203, represented as interface 203Q.

Figure 3:
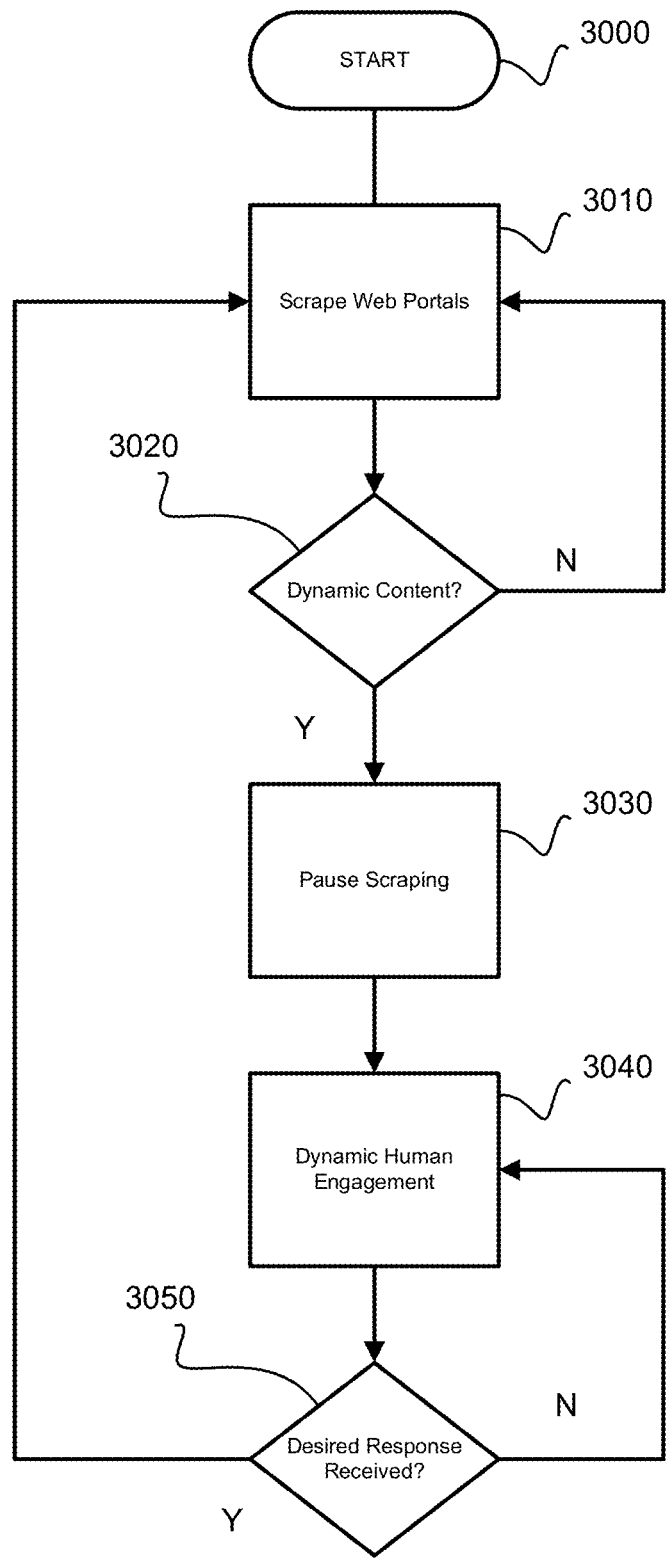
FIG. 3 is a flow chart illustrating high-level aspects of a method for automation of interactions with web portals with dynamic contents in accordance with some embodiments of the present disclosure.

Referring to FIG. 3, aspects of a computer-implemented method 3000 for controlling a headless browser automation with dynamic human engagement in the system 10 in accordance with an embodiment of the present disclosure are illustrated in a high-level process flowchart. In an aspect, the method starts at step 3000, where one or more processors (hereinafter individually or collectively, "processor") perform scraping of web portals (e.g., web portals 20: FIG. 20) at 3010. If dynamic content is encountered by the processor (e.g., running the request response sequencer 300: FIG. 2) while scraping at 3020, the processor then pauses the scraping at 3030. The processor then initiates a dynamic human engagement process (further described below with respect to FIG. 4) at 3040 to fetch an interactive response (e.g., HTTP response) from a human user. In an aspect, the processor continues performing (one or more iterations of) the dynamic human engagement until the desired response is obtained from the human user. If desired response is obtained from the human user at 3050, the processor resumes scraping of the web portals using the received response.

Referring to FIG. 4, aspects of the dynamic human engagement process 3040 according to an embodiment of the present disclosure are described. In an aspect, the process 3040 starts at 4000. At, 4010, the processor (e.g., running the control system 500: FIG. 2) receives one or more DOMs of one or more webpages containing a dynamic content. Examples of the dynamic content DOMs are described below with reference to FIGS. 5-6.

In an aspect, at 4020, the processor extracts an intermediate value structure from DOM received in 4010. In an aspect, the intermediate structure is an input value (set of values) called "q_dic" (question dictionary), which will be used by the processor (e.g., a sub function of the request response sequencer 300: FIG. 2) to produce a presentation agnostic format data. An example of the "q_dic" modal code is described with reference to FIG. 10 below. In an aspect, the sub function is designed to support a range of different dynamic content response use cases. In an aspect, the structure of the "q_dic" varies depending on the nature of the dynamic response required. For example, each "q_dic" may contain a question_type field that is used by the processor to invoke a specific sub-function that is specialized to accommodate varying complexities of dynamically generated content.

In an aspect, the required fields of the "q_dic" are as required by the inputs of the "portalcommonlayout" sub functions for the question_type. For example, in an embodiment of the present disclosure, in the use case of the multiple choice question, the "q_dic" has the following fields (also reproduced in FIG. 7):

```
question_dict = {
    "question"     : "Which of the following is the primary reason for
    this request?",
    "question_type": "radio-button",
    "opt_list"     : ['Aneurysm','Aortic dissection','Thrombosis in the
systemic and portal venous circulations','Henoch-Schonleion purpura
(HSP)','None of these apply','Unknown'],
    "site"         : "Provider site 1"
}
```

In an aspect, in the use case of a request for a free text response, the "q_dic" has the following fields (also reproduced in FIG. 8):

```
question_dict = {
    "question"     : "Please describe the reason for this request",
    "question_type": "textarea",
    "opt_list"     : ['Please type Below'],
    "site"         : "Provider site 2"
}
```

In an aspect, according to an embodiment for a specific case of the multiple choice questions in the dynamic content 101 as shown in FIG. 2, the algorithm for converting the DOM into the q_dic required by the function, "portalcommonlayout," is as follows:

While not stop indicator extract question and options:
question_element=DOM element whose id is 'Question'
question=question_element.text # extract question from DOM
option_element=DOM element whose id is 'Answer'
options_list=within option_element find DOM elements whose HTML tag is 'label'
for option in options_list:
    opt_list.append(option.text)
question_type=get answer_type attribute from DOM element whose id is 'Answer'
If question_type=='radio':
    question_type='radio-button'

If question_type=='textarea':
    question_type='textarea'
. . . .
Create and update question_dic with all the information we got from provider portal
    question_dict=
    question_dict['question']=question
    question_dict['question_type']=question_type
    question_dict['opt_list']=options
    question_dict['site']='Provider site 1'

In an aspect, in the use case of a request for a free text response, the algorithm for converting the DOM into the q_dic required by the function, "portalcommonlayout," is as follows:

While not stop indicator extract question and options:
    question_element=DOM element whose name is 'QuestionPart'
    question=question_element.text # extract question from DOM
    option_element=DOM element whose name is 'AnswerPart'
    options_list=within option_element find DOM elements whose tag is 'textarea'
    opt_list=['Please type below' ]
    question_type=get answer_type attribute from DOM element whose id is 'AnswerPart'
    If question_type=='radio':
        question_type='radio-button'
    If question_type=='textarea':
        question_type='textarea'
Create and update question_dic with all the information we got from provider portal
    question_dict['question']=question
    question_dict['question_type']=question_type
    question_dict['opt_list']=options
    question_dict['site' ]='Provider site 2'

In an aspect, at 4030, the processor creates a modal data structure (e.g., Python dictionary) of the extracted intermediate structure (e.g., "q_dic"), which is a presentation agnostic format data. For example, in an aspect, the resulting "q_dic" from 4020 is then passed to the function, "portalcommonlayout," which returns a modal data structure. In some embodiments, the modal data structure is a Python dictionary, which may be readily converted into a language independent data format for transmission. In an aspect, the language independent data format is a JavaScript Open Notation (JSON), or application/json format.

For example, in an embodiment, the following code snippet includes the source code in Python format to generate presentation agnostic format structures (modals) for two types of dynamic content response uses cases—a multi-select list of questions (multiple choice questions) as is shown in FIG. 2, and a free text response question:

```
def portalcommonlayout(self, q_dic):
    try:
        if q_dic.get('question_type') in ['radio-button', 'check-box']:
            return self.genRadioModule(q_dic)
        elif q_dic.get('question_type') in ['textarea']:
            return self.genFreeTypeModule(q_dic)
        else:
            self.vlog.error('Encounter new question type')
    except Exception as why:
        self.vlog.error('portal commonlayout, { }'.format(why))
def genRadioModule(self, q_dic):
    try:
        radio = {
            "class": "Modal",
            "type": "radio", # replace with question type
            "modalType": "portalRadioEditor", # replace with modalType for other question type
            "header":
                {
                    "class": "ModalHeaderElement",
                    "title": "Editor", # replace with site name and tracking tag
                    "subtitle": "question" # replace with portal question
                },
            "table": [ ],
            "body":
                [
                    # {
                    #   "class": "ModalBodyElement",
                    #   "type": "radio-button",
                    #   "title": "Head trauma"
                    # },
                ],
            "OK_label": "OK",
            "Cancel_label": "Cancel"
        }
        modal_body = {
            "class": "ModalBodyElement",
            "type": "radio-button",
            "title": "Head trauma" # replace with option
        }
        modal = radio.copy( )
        modal['header']['title'] = q_dic['site'] + ' ' + self.identity
        modal['header']['subtitle'] = q_dic['question']
        modal['header']['type'] = q_dic.get('question_type', 'radio-button')
        modal['table'] = q_dic.get('table', [ ])
        for option in q_dic.get('opt_list', [ ]):
            body = modal_body.copy( )
            body['title'] = option
            body['type'] = q_dic.get('question_type', 'radio-button')
            modal['body'].append(body)
        self.vlog.info('portal modal' + str(modal))
        return modal
    except Exception as why:
        self.vlog.error('genRadioModule, { }'.format(why))
def genFreeTypeModule(self, q_dic):
    try:
        radio = {
            "class": "Modal",
            "type": "textarea", # replace with question type
            "modalType": "portalRadioEditor", # replace with modalType for other question type
            "header":
                {
                    "class": "ModalHeaderElement",
                    "title": "Editor", # replace with site name and tracking tag
                    "subtitle": "question" # replace with portal question
                },
            "table": [ ],
            "body":
                [
                    # {
                    #   "class": "ModalBodyElement",
                    #   "type": "radio-button",
                    #   "title": "Head trauma"
                    # },
                ],
            "OK_label": "OK",
            "Cancel_label": "Cancel"
        }
        modal_body = {
            "class": "ModalBodyElement",
            "type": "radio-button",
            "title": "Head trauma" # replace with option
        }
        modal = radio.copy( )
        modal['header']['title'] = q_dic['site'] + ' ' + self.identity
        modal['header']['subtitle'] = q_dic['question']
        modal['header']['type'] = q_dic.get('question_type', 'textarea')
        modal['table'] = q_dic.get('table', [ ])
        for option in q_dic.get('opt_list', [ ]):
            body = modal_body.copy( )
            body['title'] = option
```

```
        body['type'] = q_dic.get('question_type', 'textarea')
        modal['body'].append(body)
    self.vlog.info('portal modal ' + str(modal))
    return modal
except Exception as why:
    self.vlog.error('genFreeTypeModule, { }'.format(why))
```

In an aspect, in an embodiment for the sample questionnaire as illustrated by the Sample Dynamically Generated Content 101 in FIG. 2, the "modal" produced by the "portalcommonlayout" function from the "q_dic" created by the processor (e.g., the request response sequencer 300: FIG. 2) from the received DOM (e.g., for the web portal 100) according to the algorithm described above is as shown below (also reproduced in FIG. 9):

```
{
"class": "Modal",
"type": "radio",
"header": {
   "class": "ModalHeaderElement",
   "title": "Provider site 1",
   "subtitle": "Which of the following is the primary reason for this
     request?"
},
"body": [
   {
      "class": "ModalBodyElement",
      "type": "radio-button",
      "title": "Aneurysm"
   },
   {
      "class": "ModalBodyElement",
      "type": "radio-button",
      "title": "Aortic dissection"
   },
   {
      "class": "ModalBodyElement",
      "type": "radio-button",
      "title": "Thrombosis in the systemic and portal venous
        circulations"
   },
   {
      "class": "ModalBodyElement",
      "type": "radio-button",
      "title": "Henoch-Schonleion purpura (HSP)"
   },
   {
      "class": "ModalBodyElement",
      "type": "radio-button",
      "title": "None of these apply"
   },
   {
      "class": "ModalBodyElement",
      "type": "radio-button",
      "title": "Unknown"
   }
],
"OK_label": "OK",
"Cancel_label": "Cancel"
}
```

In an aspect, in an embodiment for the sample questionnaire involving a use case of a request for a free text response, the "modal" produced by the "portalcommonlayout" function from the "q_dic" created by the processor (e.g., the request response sequencer 300: FIG. 2) from the received DOM (e.g., for the web portal 100) according to the algorithm described above is as shown below (also reproduced in FIG. 10):

```
{
"class": "Modal",
"type": "textarea",
"header": {
   "class": "ModalHeaderElement",
   "title": "Provider site 2",
   "subtitle": "Please describe the reason for this request"
},
"body": [
   {
      "class": "ModalBodyElement",
      "type": "textarea",
      "title": "Please type blow"
   }
],
"OK_label": "OK",
"Cancel_label": "Cancel"
}
```

Figure 11:
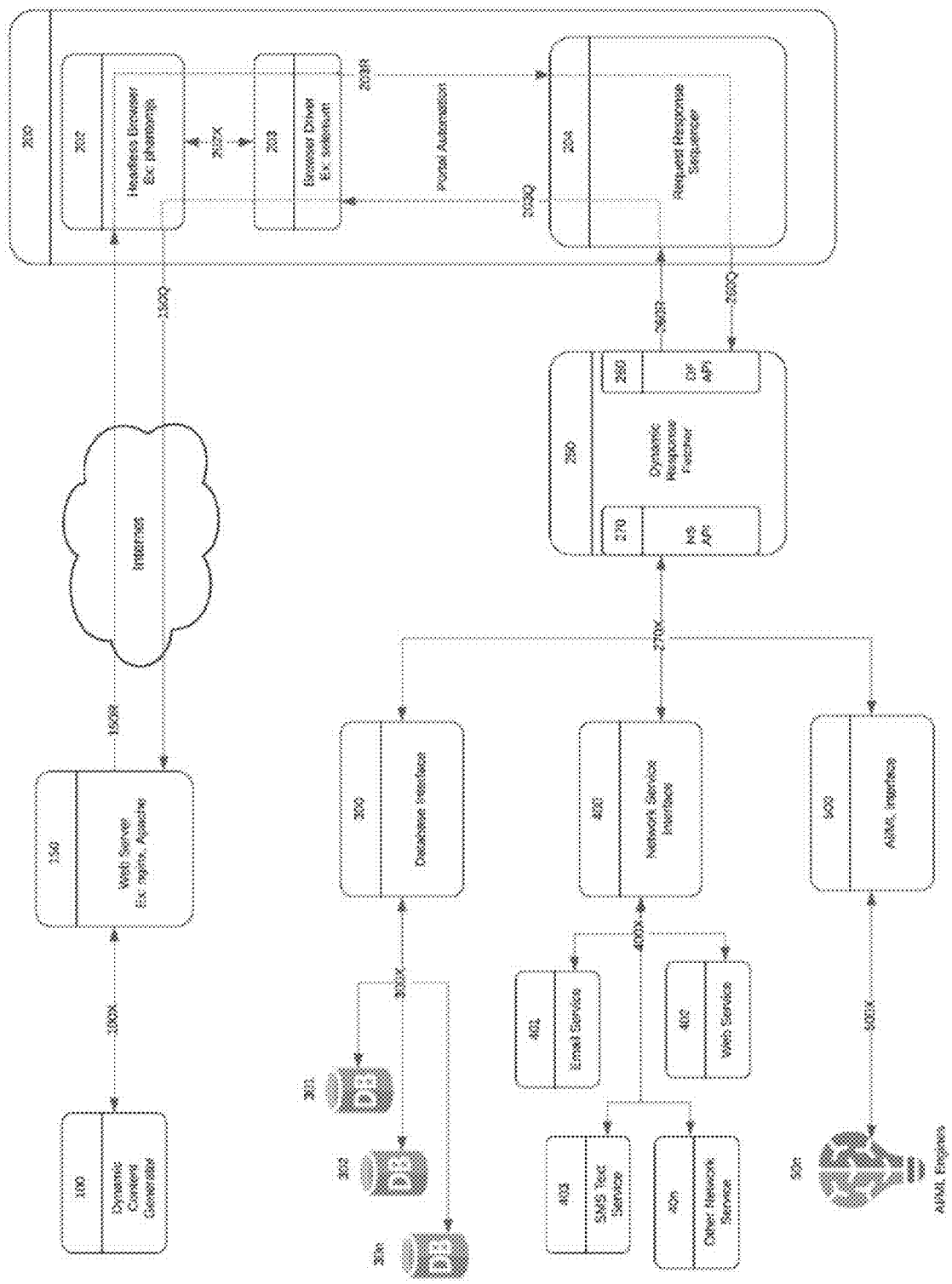
FIG. 11 is a schematic block diagram illustrating aspects of a system and apparatus for automation of interactions with web portals with dynamic contents in accordance with another embodiment of the present disclosure.

In an aspect, at 4040, the processor converts the presentation agnostic format data (modal created in 4030) into a presentation specific format data. In an aspect, the presentation specific format data is in a JSON format. For example, in an aspect, the presentation agnostic representation is in the format of a Python dictionary, which may be readily converted to a type application/j son, or any suitable format for content-types used in the HTTP protocol for requests and responses. An example of a JSON file is shown in FIG. 11.

In an aspect, the modal includes the context (e.g., header.title, header.subtitle), the data (e.g., list of modal bodies, each of which contains a body.title which is the data itself), and the response needed (e.g., the body.type associated with the data for each of the modal bodies).

In some embodiments, the "portalcommonlayout" function is continuously expanded to include new gen* subfunctions to support the ever growing and changing variety of dynamic content generated by web portals.

In an aspect, one or more rendering templates (HTML templates) may be used by the processor to generate the presentation specific format data from the presentation agnostic format data. For example, below is an example HTML template for rendering the presentation agnostic format of the interactive response for the multiple choice questions shown in FIG. 2:

```
<div id="PortalSidePanel" ng-class="{'opened' : showPortalPanel }"
xmlns="http://www.w3.org/1999/html">
   <button id="genPortalPanel" ng-click="genPortalPanel( )"></button>
   <div class="portal-panel-content" ng-show="showPortalPaner">
      <!--<div class="modal-header">-->
         <!--<h3 class="modal-title">{{elem.header.title}}</h3>-->
         <!--<label>Window will close in </label><span>{{timeleft}}</span>-->
      <!--</div>-->
      <div class="modal-body">
```

```
        <div>{{elem.header.subtitle}}</div>
        <div id="editorModal" class="editor-modal">
            <div class="modal-mid">
                <label class="info" style="width:3.3rem">Question</label>
                <table style="width:100%" ng-show="elem.table">
                    <tr ng-repeat="trow in elem.table">
                        <td ng-repeat="tdata in trow">{{tdata}}</td>
                    </tr>
                </table>
                <div></div>
                <div ng-repeat="elem in elem.body">
                    <input ng-if="elem.type === 'radio-button'" type="radio" name="portalRadio" ng-click="checkradio(elem.title)"><label ng-if="elem.type === 'radio-button'" ng-bind="elem.title | uppercase"></label>
                    <input ng-if="elem.type === 'check-box'" type="checkbox" ng-model="modelToBind[elem.title]"><label ng-if="elem.type === 'check-box'" ng-bind="elem.title | uppercase"></label>
                    <label ng-if="elem.type === 'textarea'" ng-bind="elem.title | uppercase"></label>
                    <div ng-if="elem.type === 'textarea'">
                        <textarea rows="3" class="dvtextarea form-control" ng-class="{ '-input-disabled' : elem['read-only'] }" type="text" ng-model="modelToBind[elem.title]"></textarea>
                    </div>
                </div>
            </div>
        </div>
        <div class="modal-footer">
            <label>Window will close in </label><span>{{timeleft}}</span>
            <button class="btn btn-primary" type="button" ng-click="cancel( )">Stop</button>
            <button class="btn btn-primary" type="button" ng-click="save( )">Save</button>
        </div>
    </div>
</div>
```

In an aspect, a rendering template can be produced based on the "question_type" specified in the presentation agnostic format, which is the modal produced by the function, "portalcommonlayout." In some embodiments, a client side framework called AngularJS may be used to expand the modal into dynamically generated content in a presentation relevant format relevant to the human user. Examples of other templating engines include React and Angular.

At 4050, the processor sends the presentation specific format data to an interactive rendering device (e.g., interactive rendering device 70: FIG. 2). For example, in an aspect, AngularJS presents the modal to the HTML layout engine by copying it to a variable called "elem" in the above rendering template example, using the following code:

```
$scope.$on('openPortalPanel', function(event, args, callback){
    if ($scope.elem){
        return
    }
    $scope.elem = args.data; //elem;
```

In an aspect, the "args" input parameter to the function handler $on('openPortalPanel') event is the modal object transmitted by the processor (e.g., transmitted to the human user rendering and response collection 600 by the interactive response fetcher 400 using web sockets: FIG. 2).

Reference will now be made to examples of the dynamic content DOMs in accordance with some aspects of the present disclosure, with reference to FIGS. 5-6.

FIG. 5 illustrates an example DOM of a sample dynamic content 101 in the form of a multiple choice question with a single response required.

FIG. 6 illustrates an example DOM of another sample dynamic content in the form of a question needing a free-text response.

Referring to FIGS. 5-6, in an aspect, there are two crucial DOM tags—a LABEL tag, and a DIV tag.

For example, in FIG. 5, the DIV tag carries the question, "Which of the following is the primary reason for the study?"

For example, in FIG. 5, the LABEL tags contain the options for the foregoing question.

In an aspect, while not shown, the DOM as shown in FIG. 5 can include different types of question that may be presented in the webpage for which this DOM is created by a web browser (e.g., headless browser 202, etc.), such as "Checkbox," "Freetext," "ValueCollect," "Radio," "Drop-down," "Likert," etc. In the example of FIG. 5, the question type is radio button.

By expanding the DIV tag, one can see that there are a number of label tags, as shown in FIG. 5. In an aspect, each label tag represents one option. For example, the option under a first label is "Aneurysm." Another example is an option, "Aortic dissection." Another example is an option, "Thrombosis in the systemic and portal venous circulations." Other examples are options, "Henoch-Schonleion purpura (HSP)," "None of these apply," and "Unknown."

In FIG. 6, the DIV tag carries the question, "Please describe the reason for this request."

In FIG. 6, another DIV tag carries the option, "textarea." This is an option for a free-text response.

Web Automation Example—Prior Authorization Requests

In an aspect, the system 10 of the present disclosure involves use of the request response sequencer 300, which utilizes portal automation 200, to automate the process of data or financial transactions online. One example involves submitting prior authorization requests to health insurance web portals (e.g., web portals 20) on behalf of health care providers and facilities ("Providers"). Typically, a health insurance company requires a prior authorization request from a Provider for a medical or health service to be performed for a patient that is a member of the health insurance plan provided by the health insurance company, before deciding to make payment on medical or health services rendered/to be rendered by the Provider to the member patient, in accordance with insurance plan benefits that the member patient may be entitled to. A prior authorization request represents an essential data exchange between an insurance company and a Provider that falls under the broad category of utilization management. The term, utilization management," as used herein, refers to a set of decisions an insurance company must make around insurance plan benefits. In an aspect, in case of health insurance, there are two main categories of decisions: clinical necessity and financial responsibility. Oftentimes, each health insurance company has its own utilization management (prior authorization) rules for determining whether the insurance company will pay a Provider for a proposed medical or health services, such as a medical procedure, treatment plan, preventative care, diagnostics, use of medical devices, etc. ("health services"). Financial responsibility is often a function of the clinical necessity of the Provider's health services being rendered to the member patient. The sophistication of health services due to rapid advances in medicine, and the business arrangements that health insurance companies make in order to manage costs, such as in-network, out-of-network, preferred provider, to name a few, are evolving rapidly.

Health insurance companies sell health plans that set forth rules for health insurance coverage that the member patients are eligible under the plans, and the coverage rules may include simple guidelines for when prior authorization requests may be required. In practice, the rules are constantly changing in response to the aforementioned advances in medicine and continuously changing business arrangements made by the insurance companies to manage costs. As a consequence, health insurance companies have replaced paper based prior authorization processes, where a form can be filled out by Providers and submitted to the insurance companies for pre-approval for the payment of services, with expert systems. In order for insurance companies to ensure that the expert systems are engaged to process the rules for determining clinical necessity and financial responsibility, they require health care providers to interact with their expert systems through the use of their health insurance web portals.

The health insurance company expert systems are responsible for interpreting plan guidelines. In some cases, the expert system may be able to autonomously decide when prior authorizations are required or not required, when prior authorizations can be approved for payment without a clinical review, when prior authorizations can be denied based on coverage determination eligibility, and when further clinical review by a medical professional or financial expert is needed for an accurate and fair decision.

With insurance plans, coverage determination rules, patient eligibility, treatment plans and contracted arrangements constantly changing, the information required by the expert systems to perform their functions also constantly change. Health insurance company expert systems work by collecting a series of inputs from health care providers through the health insurance company web portal, performing a range of data analysis, and if needed to continue, soliciting additional feedback from the provider until it can arrive at a final decision point regarding approval, denial, redirection (approval of the service but only for specific service providers), or pending due to the need for clinical review.

A common way for expert systems to collect input from the health care providers through the web portals is through the use of dynamically generated questionnaires (e.g., dynamic content 101 in FIG. 2). In case where a conventional portal automation is engaged in the process of automating a prior authorization through an insurance company web portal, the portal automation may know that dynamic questions may arise, and it may even have sufficient information collected from the provider in advance to be able to autonomously respond to the dynamically generated questions, but oftentimes the dynamically generated questionnaires cannot be predicted or responded to with the data and logic available to the conventional portal automation.

Referring again to FIG. 2, in accordance with an embodiment of the present disclosure, the request response sequencer 300 uses portal automation 200 to script the process of submitting a prior authorization through a health insurance web portal 100. The health insurance web portal 100 receives inputs from the request response sequencer 300 over interface 150Q and passes the inputs to the health insurance company expert system, represented in the figure as the dynamic content generator 120. The health insurance company expert system 120 generates a dynamic content 101 in the form of a generated questionnaire, which is received by the request response sequencer 300. In an aspect, the dynamic response 101 is received by the request response sequencer 300 as a change in the DOM over the interface 203R. In an aspect, the request response sequencer 300 uses a series of one or more additional function calls (e.g., Selenium function calls) to inspect the DOM to decide if it can continue with the website automation, or it must instead pause to engage a human user 60 (FIG. 1) via the interactive response fetcher 400. For example, when a DOM is received, the request response sequencer 300 may need to inspect more than one web element to make the decision. For example, in some aspects, the questionnaire may include a number of web elements, each of which may need to be read using a function call. In some cases, the request response sequencer 300 may need to inspect other elements (such as navigation buttons) before looking for the presence of a questionnaire. In an aspect, a series of DOM inquiries may be involved as part of the processing of an individual step of the request response sequencer 300 to determine whether it must pause the website automation and engage a human user.

In an aspect, when the request response sequencer 300 encounters a questionnaire it cannot process, it pauses its current request response processing and uses an interactive response fetcher 400 to engage a human user for the response.

In an aspect, the request response sequencer 300 generates a context (e.g., 910), a presentation agnostic form of the data (e.g., 920: FIG. 9), and at least one desired response (e.g., one or more elements 930 indicated by an arrow: FIG. 9), and then uses a logical application programming interface IF API 460 for the interactive response fetcher 400 to obtain the data necessary to process the dynamic content 101. In an aspect, the IF API 460 can be any form of logical interface, including a function call, a message over a network, etc., depending on the form of communication that the interactive response fetcher 400 undertakes. In an aspect, the interactive response fetcher 400 is a program supported by a representational state transfer (REST) protocol, such as a REST API, and the request response sequencer 300 uses HTTP messages to send and receive data from the interactive response fetcher 400.

In an aspect, the interactive response fetcher 400 engages the human user rendering and response collection system 600 using its IR API 470. In an aspect, the IR API 470 can be any form of logical interface, such as a function call, a message over a network, etc., depending on the form of communication that the human user rendering and response collection system 600 undertakes. For example, in an aspect, the human user rendering and response collection system 600 is a web browser, and the IR API 470 is a web socket connection. In an aspect, the interactive response fetcher 400 pushes the requested information 460Q received from the request response sequencer 300 to the human user rendering and response collection system 600 as a converted requested information 470Q, using web sockets.

In an aspect, the human user rendering and response collection (HURRC) system 600 presents the dynamic content 101 scraped by the portal automation 200 to the user 60 (represented by the converted requested information 470Q) using a man-machine interface relevant to the human user 60's interface needs by taking the dynamic content 101 including the dynamic content use case 102, scenario 103, context 104, dynamic content data 105, and desired response information 105a-105f (See FIG. 2) sent by the request response sequencer 300 and converting it to a presentation relevant form relevant to the human user 60. In an aspect, the presentation relevant form 601 is generated by using one or more rendering templates (e.g., HTML templates) and presented to the human user 60 in a browser 600, such as what is illustrated as the HURRC presentation 601.

In an aspect, the HURRC presentation 601 includes context 604, data 605 and controls 608 to supply the desired responses 605a-605f, as well as some control elements 606 including a timer 606a, and buttons to control whether or not to continue, such as a Save button 606c, or whether or not to stop, such as a Stop button 606b, as illustrated. Other control elements 606 for accepting user input may be used, including means to enable the human user rendering and response collection 600 to interface with a human user 60. For instance, such interface means may include audio/voice input, brainwave input, optical/image (e.g., facial recognition or expression) input, tactile input, motion (gesture) input, etc. As such, the manner in which the dynamic content 101 generated by the web portal 20 can be handled by the system 10 of the present disclosure is not limited to what is described or illustrated by the description and figures of the present disclosure per se.

For example, where a human user 60 chooses to provide a useful response to a HURRC presentation 601 on the human user rendering and response collection system 600 via interface 600X, the user 60 may answer the questions provided in HURRC presentation 601 by clicking the Save button 606c. In an aspect, clicking the Save button 606c results in the human user rendering and response collection system 600 sending an HTTP response message 470R to the interactive response fetcher 400, which is relayed by the interactive response fetcher 400 to the request response sequencer 300 by sending a return HTTP response message 460R back to the request response sequencer 300.

In an aspect, the dynamic response processing according to an embodiment of the present disclosure concludes with the request response sequencer 300 extracting the human user response information embodied in the HTTP response 460R, and then the control system 500 restarting the scraping process on the portal automation 200 using the received data 460R. In some aspects, while Selenium provides the headless driver 203 function in certain embodiments, the control system 500 may also choose to interact directly with the headless browser 202 over the interface 202X, as previously discussed.

Current State:

The current process that most healthcare providers and facilities ("Providers") have to go through in order to request prior authorization is as follows: 1. Assemble supporting clinical materials for patient, and 2. Prepare form supplied by payer and submit via fax with clinicals to payer, OR login to payer web portal, fill out portal screens, upload clinicals.

Providers typically have a mix of 5 to 200 payers, of which 2 to 50 may have their own payer portals. Therefore, Providers could be logging into several, even dozens of portals, over the course of one day while submitting prior authorizations for their patients. This requires different login credentials for each portal. Despite the electronic nature of portals, Providers still cannot aggregate their data without resorting to a separate record keeping mechanism that requires duplicative/redundant work.

In an aspect, the system and method of the present disclosure ("VALER") acts like a "superportal." Through VALER, which already contains the patient data as well as the clinical documentation, the Provider may enter the prior authorization information into the superportal, and VALER brings back any relevant information. In an aspect, once the Provider has used VALER to do the prior authorization submission, Providers can see real time data about submission into payers without the Provider having to do anything else but submit prior authorizations into the superportal.

In an aspect, VALER is customized to the Provider's use. In an aspect, VALER provides a central database of Provider information designed to the Provider's specifications. In an aspect, the central database customized to such specifications can still communicate with the payer portals, which in turn have their own portal specifications. In an aspect, VALER's centralized storage of information optimizes Provider resources but also provides real time aggregation of patient data.

The Importance of a Single Data Repository for Tracking:

The requirement to use multiple portals to carry out financial transactions poses more than just a labor cost problem. A prior authorization is characterized by an intrinsic state, nominally, pending, approved or denied, the most common among a number of possibilities. Disposition of the prior authorization request is often not immediate. It is common for a request to be submitted, and then provider staff must periodically check back on the payer portal to determine the state of the request.

A second problem with the requirement to use multiple portals is also the difficulty in generating an accurate report regarding the disposition of prior authorization requests in progress. Since the information regarding the status of the authorizations are distributed across many payer portals, the current solution for tracking the disposition of requests is to manually enter information into a separate tracking system for the purpose of reporting.

A separate tracking system has a number of disadvantages. First, manual data entry is duplicative work. Second, the potential for errors from manual data entry is significant, both in terms of the timeliness of the data entered as well as the accuracy of the information. Third, prior authorization requests carry a lot of context information in the form of patient and physician demographics. These data elements must also be continuously synchronized as well for the reports to be meaningful.

In an aspect, an automation platform such as VALER has a complete data set, solving the problem of manual entry of tracking data. In an aspect, VALER has real time status of all requests in progress, no separate tracking system is needed. For the tracking data to maintain its integrity, it is necessary that all prior authorizations be processed to completion through the portal automation. In the case, for example, where a portal automation was unable to successfully run to completion due to a website introducing dynamic content, then the automation cannot gather essential data from the payer portal, including assigned payer authorization numbers, the initial status of the authorization request, or visual artifacts such as an authorization summary page required to be provided at the time of billing.

Another operational problem solved by having an automation and a single data repository relates to cost estimates and budgeting. The current (conventional) manual process requires health care providers to carry many staff people to carry out the prior authorization work. Individual workers can have high variance in efficacy, and providers need productivity reports in order to make projections on the cost required to scale their operations. Capturing data in order to track the length of time individuals take to perform the manual activities is time consuming and labor intensive. Workers are often interrupt-driven, and payer portals can vary in ease of use and response times. Backlog is a common problem, and backlog has a direct impact on patient care delivery.

In an aspect of the present disclosure, an automation that uses a common user interface for all portal interactions solves two problems. First, it normalizes the user experience which eliminates the time variances associated with different payer portals. Second, the automation directly tracks the efficacy of users through all aspects of the process, including how long each stage of the authorization takes as well as how accurate they are with the data entry. In an aspect, VALER provides detailed productivity reports that allow the health care providers to have critical operational insight so that process optimizations can be performed that minimize costs and maximize worker productivity. This solution is only possible as long as VALER continues to have an accurate data set relative to the state of all authorizations across all payer portals.

Non-Obvious User Experience Elements:

Prior authorization requests represent an essential data exchange between an insurance company and a health care provider that falls under the broad category of Utilization Management. Utilization Management in colloquial terms is the set of decisions an insurance company must make around insurance plan benefits. There are two main categories of decisions: clinical necessity and financial responsibility.

Insurance plan benefits can be extremely complex. Primary insurances, secondary insurances, in-network benefits, out-of-network benefits, deductibles, out-of-pocket amounts, the list goes on. Prior authorizations arose as a means for insurance companies to gather data in order to pre-determine whether a set of desired services for a patient were clinically necessary and financially covered before the services are rendered. Approval artifacts are required by insurance companies before they will pay out on a financial claim from a provider.

Currently, there is no standard on which insurance companies have agreed that define the necessary and sufficient data set in order for an insurance company to accept and process a prior authorization request. The result is that every insurance company prior authorization form is different, and one insurance company does not accept another insurance company's form. The same goes for payer portals. Like insurance company forms, most insurance company websites differ from one another. Often, they differ dramatically.

In an aspect of the present disclosure, the VALER "superportal" user experience allows a user to supply all the necessary and sufficient data for ANY insurance company portal. Nominally, this requires the ability to capture any data element that may be present on any insurance company form or be required to be entered in any insurance company portal.

In an aspect, the VALER user experience is run-time changeable and run-time adaptable, depending on which insurance company the user wishes to submit an authorization request to. Further, in an aspect, the user experience can only present choices to the user that are valid for a given insurance company context.

For example, assume there is a health care provider that must obtain authorizations from Insurance Company A and Insurance Company B. Insurance Company A contracts with a network of specialists, and Insurance Company B contracts with another network of specialists that partially overlaps with Insurance Company A.

In an aspect, when a user of the VALER selects Insurance Company A, then the list of specialties and the list of specialists presented by VALER must completely match exactly what Insurance Company A supports. Further, if the user made an error and switches the context to Insurance Company B, then VALER must ensure that any selections that are not valid for Insurance Company B must be removed, and the user presented with new choices that only match the possibilities for Insurance Company B.

In some embodiments, physician demographics and specialties are only one example of the ways in which two insurance company portals may differ. In an aspect, VALER takes into consideration the ways in which dozens of insurance company portals can represent information differently to arrive at a single user experience that is capable of being a front-end for all of them.

The introduction of dynamic content within an insurance portal necessitates the development of another layer of non-obvious user experience elements. The responding user that must provide the data entry for a portal automation to continue must have the full context of the operation in progress. Without the full context, it is not possible for the responding user to gather the additional information for an accurate response.

In an aspect, the VALER user interface has been adapted to allow for dynamic content to be integrated into a visual presentation that retains all the original request context. For example, in some embodiments, it is possible for all parts of the original request to be reviewed and evaluated, and there is sufficient information if the user must access other systems such as the health care provider electronic health record system to obtain the data.

The presence of dynamically generated content in the insurance company web portals has had a direct impact on the labor cost associated with the authorization request submission process. Correspondingly, in an aspect, VALER incorporates increasingly more sophisticated automation strategies to offset the rising labor costs. Although in many cases, dynamically generated content in the form of clinical surveys requires a clinician or qualified Provider representative to provide direct responses, one set of strategies involves the use of autonomous processes to fetch responses for dynamically generated content without the need to engage a human user (see, e.g., FIG. 11).

Referring to FIG. 11, the figure (Interactive Portal Automation with Autonomous Dynamic Response) provides a conceptual structuring of the logical components involved in autonomous dynamic response processing in accordance with one more embodiments of the present disclosure. Note that there are numerous ways to organize software in a manner to perform the processes as described, and except in the obvious case of messages being passed over the Internet, the interactions between logical components can take the form of function calls, inter-thread or inter-process communications, or even message passing between computers in geographically separate regions.

In some aspects of the present disclosure:

Part 1: The process begins with 200: Portal Automation, triggered by a user and background task initiating a portal submission.

200: Portal Automation, is launched by an external process

The external process configures 200 with information necessary to connect to an instance of 250: Dynamic Response Fetcher

200 creates a 202: Headless Browser instance

200 creates a 203: Browser Driver instance, and attaches 202 to 203 programmatically

200 creates a 204: Request Response Sequencer for the target insurance company web portal

204 has a pre-defined sequence of steps required to perform a prior authorization request submission.

200 configures 204 to with information necessary to connect to an instance of 250.

204 uses 203 to connect to the insurance company web portal using 203Q (a request interface)

Each request sent via 203Q results in a corresponding HTTP/S message being sent by 202 over 150Q, which is the standard interface protocol for the Internet The insurance company web portal, 150: Web Server, processes the incoming requests and passes them to a business logic system, 100: Dynamic Content Generator.

100 responds via 150 with modifications to the HTML DOM and/or other response data, which is propagated through 202 and 203 before arriving at 204 over 203R (generally, a browser event captured by 203).

204 inspects the data in the 203R response by analyzing response data and changes to the HTML DOM it was expecting to receive

204 uses the Request Response process outlined in Step 6 until it completes its sequence of steps, or, it detects a condition ("Dynamic Response Needed") in the HTML DOM that does not match the required initial conditions for the next sequential step.

Part 2: Process for Managing Dynamic Response Needed

204 pauses the request/response sequencing in progress.

204 engages 250 by using 260Q (a request protocol) to send a request for dynamic content

204 passes contextual information in the request that 250 can use to engage a service appropriate for fetching a valid response

250 connects to one or more of 300: Database Interface, 400: Network Service Interface, or 500: AI/ML interface, using 270Q (a request protocol, which can vary depending on both the nature of the service interface and information being requested).

250 receives a response from 300, 400 or 500 over 270R (a response protocol, which can vary depending on both the nature of the service interface and information being requested), as appropriate, and forwards the information back to 204 using 260R.

204 processes the information from 250, incorporating it as one or more steps in the sequence

204 may also re-arrange the remaining steps as needed

204 restarts the portal automation by sending another request to 150 via 203Q

Example: Using dynamic autonomous responses for sites using multi-factor authentication A common, simple use case for the use of Dynamic Autonomous Responses is for insurance web portals that use multi-factor authentication. In Part 1, during the iteration is Step 6, 204 detects that there is a change to the HTML DOM which includes a control for the user to enter a security code, which has been sent via email to the user associated with the automation.

For this case, 250 is provided to 204 by 200 in the form of a URL and credentials for a 401: Email Service (web based), though it could easily have been a URL and credentials for a web based 403: SMS Text Service (web based).

204 imports a module which allows it to send and receive messages to the web based mail service. The module may provide a number of mechanisms to simplify the process, or require 204 to perform a number of steps to extract the necessary code from the email.

Using 250, 204 is able to find the confirmation email message containing the access code. It extracts the access code, and using 203Q, enters the access code into the corresponding HTML DOM element for the control, and then using 203Q, clicks the appropriate button to continue with the browser automation sequence.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), voice response systems, and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other formats). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

What is claimed is:

1. A computer-implemented method for controlling a headless browser automation comprising:
    scraping, by one or more processors, a plurality of web portals each configured for processing insurance coverage requests;
    receiving, by the one or more processors, a dynamic content containing data in a presentation specific form from one or more of the plurality of web portals;
    pausing, by the one or more processors, scraping of the plurality of web portals, based on determining that the dynamic content requires engaging a user before the scraping of the one or more of the plurality of web portals can continue;
    extracting from the dynamic content, by the one or more processors, context information, a query for a desired response and a data set for utilization management comprising insurer decisions based on insurance plan benefits;
    converting, by the one or more processors, the context information, the query for the desired response, and the extracted data set into a modal data structure comprising presentation agnostic converted data;
    presenting, by the one or more processors, the converted data to the user via a human user rendering and response collection system;
    receiving, by the one or more processors, data responsive to the query for the desired response from the user; and
    resuming, by the one or more processors, scraping of the plurality of web portals using the received data responsive to the query for desired response.

2. The method of claim 1, wherein the human user rendering and response collection system includes a man-machine interface selected from a group consisting of a touchscreen, a voice response system, a user interface designed for use by a human with disabilities, a brain-computer interface, or a combination thereof.

3. The method of claim 1, wherein the converted data is presented to the user using a representational state transfer (REST) application programming interface (API), wherein the data responsive to the query for desired response is received from the user using the REST API, or both.

4. The method of claim 1, wherein the data in the received dynamic content is converted into the modal data structure by a sub function configured to support a plurality of dynamic content response use cases.

5. The method of claim 4, wherein the plurality of dynamic content response use cases include a request to submit free text response, a request to enter multi-factor authentication code, and a request to answer multiple choice question.

6. The method of claim 4, further comprising extracting a question dictionary from the dynamic content, and wherein the sub function produces the modal data structure from the question dictionary.

7. The method of claim 6, wherein the modal data structure produced from the question dictionary is specific to each of the plurality of dynamic content response use cases.

8. The method of claim 6, further comprising converting the modal data structure into a language-independent data format before the presenting.

9. The method of claim 6, wherein the data structure is in a Python dictionary format.

10. The method of claim 8, wherein the language-independent data format is JavaScript Object Notation.

11. The method of claim 1, wherein the presentation specific form is specific to each of the plurality of web portals.

12. The method of claim 1, wherein the data set for utilization management includes one or more prior authorization requests.

13. An apparatus for controlling a headless browser automation comprising at least one processor coupled to a memory, the memory holding program instructions that when executed by the at least one processor cause the apparatus to perform:
  scraping a plurality of web portals each configured for processing insurance coverage requests;
  receiving a dynamic content containing data in a presentation specific form from one or more of the plurality of web portals;
  pausing scraping of the plurality of web portals, based on determining that the dynamic content requires engaging a user before the scraping of the one or more of the plurality of web portals can continue;
  extracting from the dynamic content context information, a query for a desired response, and a data set for utilization management comprising insurer decisions based on insurance plan benefits;
  converting the context information, the query for the desired response, and the data set into a modal data structure comprising presentation agnostic converted data;
  presenting the converted data to a user via a human user rendering and response collection system;
  receiving data responsive to the query for the desired response from the user; and
  resuming scraping of the plurality of web portals using the data responsive to the query for the received desired response.

14. The apparatus of claim 13, wherein the human user rendering and response collection system includes a man-machine interface selected from a group consisting of a touchscreen, a voice response system, a user interface designed for use by a human with disabilities, a brain-computer interface, or a combination thereof.

15. The apparatus of claim 13, wherein the converted data is presented to the user using a representational state transfer (REST) application programming interface (API), wherein the data responsive to the query for the desired response is received from the user using the REST API, or both.

16. The apparatus of claim 13, wherein the data in the received dynamic content is converted into the modal data structure by a sub function configured to support a plurality of dynamic content response use cases and executed by the at least one processor.

17. The apparatus of claim 16, wherein the plurality of dynamic content response use cases include a request to submit free text response, a request to enter multi-factor authentication code, and a request to answer multiple choice question.

18. The apparatus of claim 16, further comprising extracting a question dictionary from the dynamic content, and wherein the sub function produces the modal data structure from the question dictionary.

19. The apparatus of claim 18, wherein the modal data structure produced from of the question dictionary is specific to each of the plurality of dynamic content response use cases.

20. The apparatus of claim 18, further comprising converting the modal data structure into a language-independent data format before the presenting.

21. The apparatus of claim 13, wherein the modal data structure is in a Python dictionary format.

22. The apparatus of claim 20, wherein the language-independent data format is JavaScript Object Notation.

23. The apparatus of claim 13, wherein the presentation specific form is specific to each of the plurality of web portals.

24. The apparatus of claim 13, wherein the data set for utilization management includes one or more prior authorization requests.

* * * * *